United States Patent [19]

Voss

[11] Patent Number: 5,282,939
[45] Date of Patent: * Feb. 1, 1994

[54] REMOVAL OF SALTS BY ELECTRODIALYSIS

[75] Inventor: Hartwig Voss, Frankenthal, Fed. Rep. of Germany

[73] Assignee: BASF Aktiengesellschaft, Ludwigshafen, Fed. Rep. of Germany

[*] Notice: The portion of the term of this patent subsequent to Feb. 18, 2009, has been disclaimed.

[21] Appl. No.: 783,868

[22] Filed: Oct. 29, 1991

Related U.S. Application Data

[60] Division of Ser. No. 729,854, Jul. 11, 1991, Pat. No. 5,089,102, which is a continuation of Ser. No. 401,872, Sep. 1, 1989, abandoned.

[30] Foreign Application Priority Data

Sep. 20, 1988 [DE] Fed. Rep. of Germany ....... 3831848

[51] Int. Cl.$^5$ .............................................. B01D 61/44
[52] U.S. Cl. ................................ 204/131; 204/182.4; 204/182.5
[58] Field of Search ............... 204/182.4, 182.3, 182.5, 204/301, 131

[56] References Cited

U.S. PATENT DOCUMENTS

| | | | |
|---|---|---|---|
| 4,227,981 | 10/1980 | Williams et al. | 204/182.6 |
| 4,324,629 | 4/1982 | Oka et al. | 204/182.4 |
| 4,778,603 | 10/1988 | Koll et al. | 210/650 |
| 4,802,965 | 2/1989 | Puetter et al. | 204/182.4 |
| 4,838,895 | 6/1989 | Galli et al. | 8/527 |

*Primary Examiner*—John Niebling
*Assistant Examiner*—Arun S. Phasge
*Attorney, Agent, or Firm*—Oblon, Spivak, McClelland, Maier & Neustadt

[57] ABSTRACT

Salts of polybasic low molecular weight acids are removed from aqueous solutions containing anionic organic compounds by electrodialysis by acidifying the aqueous solution before or during salt removal.

20 Claims, No Drawings

REMOVAL OF SALTS BY ELECTRODIALYSIS

This is a division of application Ser. No. 07/729,854, filed on Jul. 11, 1991, now U.S. Pat. No. 5,089,102, WHICH IS A CONTINUATION OF Ser. No. 07/401,872, FILED ON SEP. 1, 1989, NOW ABANDONED.

The present invention relates to a novel process for removing salts by electrodialysis from an aqueous solution which contains anionic organic compounds by acidifying the aqueous solution before or during salt removal.

It is known that for example salt-containing solutions of anionic dyes or anionic fluorescent whitening agents can be demineralized with the aid of reverse osmosis or ultrafiltration. However, these pressure-driven techniques are associated with a number of disadvantages. The first of these is the high pressure required (in general from 10 to 100 bar) to overcome the osmotic pressure of the solution to be demineralized. As well as expending the energy to create and maintain this pressure, for example by means of pumps, it is necessary to use appropriately built apparatus capable of withstanding it. To obtain substantial demineralization by this technique it is necessary to repeat the process in certain circumstances several times after addition of demineralized water, which produces correspondingly large amounts of waste water. However, this waste water is highly contaminated even with a membrane which has for example a dye retention capacity of 99.5%.

A further serious problem is membrane selection, in particular if the molecular weight of the anionic organic compound to be demineralized is less than 1000. This is because if the separating limit chosen is too low, the salts are difficult to separate off. If, however, the separating limit chosen is too high, demineralizing will take place with a high permeate flow and low transmembrane pressure, but a great deal of useful product is lost. For instance, a cellulose-based membrane (for example CA 930 PP from DDS) having a molecular separating limit of 500 (i.e. the membrane has by definition a retention of 90% for an organic product having a molecular weight of 500) has a retention of 30% for sodium chloride and a retention of 85% for sodium sulfate. Since, however, the retention capacity of a membrane depends not only on the molecular weight of the compound to be demineralized but also on its chemical structure and its functional groups, it is necessary to find the right membrane for each separating problem.

It is also known to remove inorganic salts by electrodialysis from water-soluble dyes. For example, JP-A-55,923/1973 describes the removal of sodium chloride from water-soluble azo dyes or water-soluble fluorescent dyes. The removal of alkali metal or alkaline earth metal halides from aqueous solutions of reactive dyes forms the subject-matter of EP-A-167,107 and DE-A-3,424,506. There it is taught that no sulfate ions should be present in the removal of halides, since the secondary membranes formed show poor permeability in respect of sulfate ions as a consequence of the substantial hydrate envelope.

It is an object of the present invention to provide a novel process for removing salts by electrodialysis, whereby it should also be possible to remove sulfates or, in general, salts of polybasic low molecular weight acids.

We have found that this object is achieved by acidifying the aqueous solution before or during salt removal.

Anionic organic compounds from which the salts of polybasic low molecular weight acids are separated are preferably those whose molecular weight is not less than 150, in particular not less than 200. There is basically no upper limit since using the process according to the invention it is even possible to demineralize oligomeric or polymeric organic compounds which have been modified to be anionic.

Possible functional groups for conferring an anionic character on these organic compounds are for example the sulfonate group ($-SO_3^\ominus$), the sulfato group ($-O-SO_3^\ominus$) I the carboxylate group ($-COO^\ominus$) and the phosphonate group ($-PO_3^{2\ominus}$).

Suitable anionic organic compounds which can be demineralized according to the invention are for example fluorescent whitening agents, dyes (for example monoazo, bisazo or trisazo dyes, anthraquinone dyes, dioxazine dyes, phthalocyanine dyes, quinophthalones or triphenylmethane dyes, which dyes may also be present in the form of copper, chromium, cobalt, nickel or iron complexes and/or have reactive groups, for example chlorotriazinylor vinylsulfonyl-based groups), mono- or polycarboxylic acids, mono- or polysulfonic acids and mono- or polyphosphonic acids.

Particular preference is given to demineralizing food dyes by means of the process according to the invention.

Possible salts of polybasic low molecular weight acids are for example the alkali metal, alkaline earth metal, ammonium, mono-, di-, tri- or tetraalkylammonium or benzyltrialkylammonium salts of sulfurous acid, sulfuric acid, phosphorous acid, phosphoric acid, boric acid, carbonic acid, oxalic acid, maleic acid, fumaric acid, citric acid or adipic acid.

The molecular weight of the anion to be removed should in general not exceed 150.

The demineralizing of aqueous salt solutions by electrodialysis and appropriate electrodialysis apparatus are known per se and described for example in H. Strathmann, Trennung von molekularen Mischungen mit Hilfe synthetischer Membranen, Steinkopf Verlag, Darmstadt, 1979, pages 76 to 86, and in D.S. Flett, Ion Exchange Membranes, Ellis Horwood, Chichester 1983, pages 179 to 191.

The process according to the invention is advantageously carried out by placing alternate anion and cation exchange membranes between two electrodes in a parallel arrangement, sealing the compartments formed by inserted spacer frames off against each other, passing the acidified, electrolyte-containing solution which contains the anionic organic compound (hereinafter also referred to as the diluate) through those compartments which are limited in the direction of the anode via an anion exchange membrane, and passing an aqueous electrolyte-containing solution (hereinafter also referred to as the concentrate) whose initial conductivity is for example from 1 ms/cm to 10 mS/cm through those compartments limited in the direction of the anode by a cation exchange membrane to receive the salt. The electrolyte used in the concentrate is in general the salt which is to be removed from the diluate, the corresponding acid, a mixture of the two or else sodium chloride.

There is a cathode and anode space separated from the diluate and concentrate compartments by the respective last membrane, preferably a cation exchange membrane. During the electrodialysis process, an electrolyte-containing solution is preferably guided past the electrodes in order to remove gases which form from the electrode compartments. The electrode rinse used is advantageously an aqueous sodium sulfate solution which contains from about 1 to 10% by weight of sodium sulfate.

The ion exchange membranes used are commercial anion- and cation-selective membranes. In general they have a permselectivity of greater than 0.9 and an electric resistance of less than 5 $\Omega.cm^2$ (Desalination 34 (1980), 77-95). The ion exchange membranes consist in general of support sheets or fabric in polyester, polyethylene or polyvinyl chloride, to which the ready-prepared exchange resins are applied or upon which the exchange resin is first polymerized in a conventional manner and then further treated in a conventional manner to obtain cation or anion exchange materials (cf. Ullmanns Enzyklopädie der technischen Chemie, 4th edition, volume 13, pages 279 et seq., 1977). It is advantageous to use in particular strongly acidic cation exchanges or strongly basic cation exchanges based on crosslinked copolymer products of styrene and butadiene or of divinylbenzene, which have been modified with sulfonic acid groups or quaternary ammonium groups, on a polyvinyl chloride support fabric. The ion exchange membranes to be used in the process according to the invention are described for example in Desalination (loc. cit.) and the references cited therein or in Ullmann (loc. cit.).

In the process according to the invention, the electrodialysis is in general carried out at a temperature which does not exceed 100° C., preferably at from 15 to 80° C., using a current density which in general does not exceed 3000 $A/m^2$, preferably being from 10 to 1000 $A/m^2$. In the course of the electrodialysis, the limiting current density of the concentration polarization may be exceeded without disadvantage in particular at the end of demineralization. The direct voltage required for electrolyte transport through the membranes here depends on the identity and concentration of the electrolyte and of the anionic organic compound in the solution to be demineralized. A further factor is the spacing of the membranes, which is dictated by the spacer frame construction of the electrodialysis cell. Owing to the electrical resistance of the electrodialysis cell, the abovementioned current densities result in voltages of up to 5 V per subsidiary cell, a subsidiary cell comprising a diluate compartment, a concentrate compartment, an anion exchange membrane and a cation exchange membrane.

The process according to the invention can be carried out not only continuously in a plurality of consecutive membrane stacks but also batchwise by recirculating the streams of liquid via buffer vessels, or by operating a continuous/batchwise hybrid form of process.

In the process according to the invention, the acidification of the aqueous solution from which the salts of polybasic low molecular weight acids are to be removed takes place either before or during the process of electrodialysis.

Suitable acids for acidifying the aqueous solution are for example inorganic acids, such as halohydric acids (hydrofluoric acid, hydrochloric acid, hydrobromic acid or hydroiodic acid), perchloric acid, sulfuric acid, nitric acid, phosphoric acid or phosphorous acid, and organic acids, such as formic acid, acetic acid, oxalic acid, mono-, di- or trifluoroacetic acid, mono- or dichloroacetic acid, monobromoacetic acid or alkanesulfonic acids, for example methanesulfonic acid.

The aqueous solution must in general be acidified to a pH which is less than the value $X+1$, where X is the $pK_a$ of the second dissociation stage of the polybasic low molecular weight acid whose salts are to be removed.

Preferably, the aqueous solution is acidified to a pH which is from $X-2$ to $X$, X being defined as above.

If sulfate ions are to be removed, this means for example that the aqueous solution must be acidified to a $pH \leq 2.9$, since the $pK_a$ of the second dissociation stage of sulfuric acid is 1.92.

If oxalate ions are to be removed, this means for example that the aqueous solution must be acidified to a $pH \leq 5.2$, since the $pK_a$ of the second dissociation stage of oxalic acid is 4.19.

It also follows from the above remarks that the acid which is used for acidifying the aqueous solution is not freely choosable, but that the choice of this acid depends on the nature of the salts of the polybasic low molecular weight acids which are to be removed. For instance, the $pK_a$ (in the case of polybasic acids that of the first dissociation stage) of the acid which is used for acidifying the aqueous solution must be less than the $pK_a$ of the second dissociation stage of the polybasic low molecular weight acid whose salts are to be removed. It follows that it is possible for example to remove sodium sulfate after acidification with sulfuric acid.

After the electrodialysis is discontinued, it is found that the aqueous solution which contains the anionic organic compound has been appreciably depleted in the salts which were to be removed. If the electrodialysis is carried on for a sufficiently long time, the removal in most cases is quantitative.

By means of the process according to the invention it is possible, surprisingly, to remove from aqueous solutions which contain anionic organic compounds salts which hitherto were considered unremovable by electrodialysis.

The Examples below will illustrate the invention in more detail.

Experimental Arrangement and General Description of the Experiments

The apparatus consists of an electrodialysis cell (an ED cell) and three circulation systems (diluate, concentrate and electrode rinse circulation systems). Each of these circulation systems is equipped with a magnetic gyro pump, a heat exchanger and a reservoir vessel (1-10 l) and connected to the ED cell via tubing.

The ED cell holds two platinum electrodes, each 35 $cm^2$ in area. The electrode spaces are separated from the adjoining concentrate compartments by Nafion ® cation exchange membranes (from Du Pont). Between the electrode compartments there are 11 concentrate and 10 diluate compartments in an alternating arrangement. The compartments are separated from each other by alternate Selemion ® AMV and Selemion CMV membranes (from Asahi Glass). All the membranes have an active surface area of 37 $cm^2$. The membrane spacing is 3 mm. The test solutions are introduced and discharged through corresponding connection holes in the sealing frames and end plates and by connection to the appropriate pumped circulation systems.

The apparatus is equipped with a direct current supply, with instruments for measuring temperature, pH, voltage, current and conductivity, and with a pH-controlled acid metering system. Batchwise operation was used.

The circulation systems of the electrodialysis apparatus were charged with the following solutions:

Diluate: 1-2 kg of a solution which besides a water-soluble anionic organic compound (hereinafter referred to as the useful product) contained salts of polybasic, low molecular weight acids.

Concentrate: 1-2 kg of an aqueous electrolyte solution having a specific conductivity of about 10 ms/cm. The electrolyte used was in general the salt to be removed. (But it is also possible to use other electrolytes, for example the acid whose salt is to be removed or the acid which is to be added.)

Electrode rinse solution: 2 kg of 5% strength by weight $Na_2SO_4$ solution.

The solutions were recirculated through the ED cell and electrodialyzed at 25°-40° C. at a cell voltage of up to 60 V and an electrodialysis current of up to 3 A. The acid was added all at once at the start or continuously (ph-controlled) during the electrodialysis after the solution had been acidified at the start with the desired pH. The flow rates for diluate and concentrate were about 3 kg/min.

The current and voltage levels depended with the system on the varying resistance of the ED arrangement. Below a cell voltage of 60 V, a current of 3 A was possible; if 60 V was reached on account of an increase in the resistance during ED, the current decreased correspondingly.

The electrodialysis was discontinued after 3.5-28 hours. The depletion in the polybasic anion was up to 99% (where 100% is equal to the amount of anion used in the diluate of a salt to be removed therefrom, before the addition of acid), and the loss of useful product from the concentrate is in general less than 1%, at any rate not more than 4%. And the useful product was concentrated by a factor of up to 1.3.

The Examples below were carried out in accordance with the general description. Runs identified as Comparative Examples were carried out without addition of acid but under otherwise identical conditions.

EXAMPLE 1

| | | |
|---|---|---|
| Useful product: | C.I. Acid Yellow 3 | |
| Salt to be removed: | $Na_2SO_4$ and NaCl | |
| Diluate used: | Amount | = 2.2 kg |
| | Useful product concentration | = 10.7% |
| | $SO_4^{2\ominus}$ concentration | = 1.1% |
| | $Cl^{\ominus}$ concentration | = 3.1% |
| Operation: | Continuously acidified with 17.2 g of 36% strength by weight HCl to pH 2.0 | |
| | Demineralization temperature | =25° C. |
| | Electrodialysis time | = 8 h |
| Result: | Useful product yield | >99% |
| | $SO_4^{2\ominus}$ depletion | = 75% |
| | $Cl^{\ominus}$ depletion | >99% |

EXAMPLE 2

| | | |
|---|---|---|
| Useful product: | C.I. Acid Yellow 3 | |
| Salt to be removed: | $Na_2SO_4$ and NaCl | |
| Diluate used: | Amount | = 2.0 kg |
| | Useful product concentration | = 10.7% |
| | $SO_4^{2\ominus}$ concentration | = 1.1% |
| | $Cl^{\ominus}$ concentration | = 3.1% |
| Operation: | Continuously acidified with 162 g of 36% strength by weight HCl to pH 1.0 | |
| | Demineralization temperature | = 25° C. |
| | Electrodialysis time | = 8 h |
| Result: | Useful product yield | >99% |
| | $SO_4^{2\ominus}$ depletion | = 98% |
| | $Cl^{\ominus}$ depletion | >99%. |

EXAMPLE 3 (COMPARATIVE EXAMPLE TO EXAMPLES 1 AND 2)

| | | |
|---|---|---|
| Useful product: | C.I. Acid Yellow 3 | |
| Salt to be removed: | $Na_2SO_4$ and NaCl | |
| Diluate used: | Amount | = 2.2 kg |
| | Useful product concentration | = 10.7% |
| | $SO_4^{2\ominus}$ concentration | = 1.1% |
| | $Cl^{\ominus}$ concentration | = 3.1% |
| Operation | No acid added (initial pH = 9.0; final pH = 6.6) | |
| | Demineralization temperature | = 25° C. |
| | Electrodialysis time | = 8 h |
| Result: | Useful product yield | >99% |
| | $SO_4^{2\ominus}$ depletion | = 32% |
| | $Cl^{\ominus}$ depletion | >99%. |

EXAMPLE 4

| | | |
|---|---|---|
| Useful product: | C.I. Acid Blue 9 | |
| Salt to be removed | $Na_2SO_4$ | |
| Diluate used: | Amount | = 1.9 kg |
| | Useful product concentration | = 19.0% |
| | $SO_4^{2\ominus}$ concentration | = 1.6% |
| Operation: | Continuously acidified with 165 g of 36% strength by weight HCl to pH 1.0 | |
| | Demineralization temperature | = 40° C. |
| | Electrodialysis time | = 8 h |
| Result: | Useful product yield | >99% |
| | $SO_4^{2\ominus}$ depletion | = 97% |
| | $Cl^{\ominus}$ content in discharge diluate | >0.03%. |

EXAMPLE 5 (COMPARATIVE EXAMPLE TO EXAMPLE 4)

| | | |
|---|---|---|
| Useful product: | C.I. Acid Blue 9 | |
| Salt to be removed: | $Na_2SO_4$ | |
| Diluate used: | Amount | = 2.0 kg |
| | Useful product concentration | = 19.0% |
| | $SO_4^{2\ominus}$ concentration | = 1.6% |
| Operation: | No acid added (initial pH = 6.7; final pH = 6.2) | |
| | Demineralization temperature | = 40° C. |
| | Electrodialysis time | = 8 h |
| Result: | Useful product yield | >99% |
| | $SO_4^{2\ominus}$ depletion | = 10%. |

EXAMPLE 6

| | | |
|---|---|---|
| Useful product: | C.I. Acid Blue 9 | |
| Salt to be removed: | $Na_2SO_4$ | |
| Diluate used: | Amount | = 1.6 kg |
| | Useful product concentration | = 23.8% |
| | $SO_4^{2\ominus}$ concentration | = 2.4% |
| Operation: | Continuously acidified with 43 g of 96% strength by weight $H_2SO_4$ to pH 1.0 | |
| | Demineralization temperature | = 35° C. |
| | Electrodialysis time | = 8 h |
| Result: | Useful product yield | >99% |
| | $SO_4^{2\ominus}$ depletion | = 67%. |

EXAMPLE 7

| | | |
|---|---|---|
| Useful product: | C.I. Acid Blue 9 | |
| Salt to be removed: | $Na_2SO_4$ | |
| Diluate used: | Amount | = 1.5 kg |
| | Useful product concentration | = 23.8% |
| | $SO_4^{2\ominus}$ concentration | = 2.4% |
| Operation: | Acidified once with 55 g of 99% strength by weight | |

-continued

|  |  |  |
|---|---|---|
|  | $H_2SO_4$ to pH 0.8 |  |
|  | (final pH = 1.0) |  |
|  | Demineralization temperature | = 35° C. |
|  | Electrodialysis time | = 8 h |
| Result: | Useful product yield | >99% |
|  | $SO_4^{2\ominus}$ depletion | = 69%. |

EXAMPLE 8 (COMPARATIVE EXAMPLE TO EXAMPLES 6 AND 7)

|  |  |  |
|---|---|---|
| Useful product: | C.I. Acid Blue 9 |  |
| Salt to be removed: | $Na_2SO_4$ |  |
| Diluate used: | Amount | = 1.5 kg |
|  | Useful product concentration | = 23.8% |
|  | $SO_4^{2\ominus}$ concentration | = 2.4% |
| Operation: | No acid added (initial pH = 6.9; final pH = 4.1) |  |
|  | Demineralization temperature | = 35° C. |
|  | Electrodialysis time | = 8 h |
| Result: | Useful product yield | >99% |
|  | $SO_4^{2\ominus}$ depletion | = 1.5%. |

EXAMPLE 9

|  |  |  |
|---|---|---|
| Useful product: | C.I. Acid Blue 9 |  |
| Salt to be removed: | $Na_2SO_4$ |  |
| Diluate used: | Amount | = 1.5 kg |
|  | Useful product concentration | = 24.2% |
|  | $SO_4^{2\ominus}$ concentration | = 3.6% |
| Operation: | Acidified once with 58 g of 96% strength by weight $H_2SO_4$ to pH 0.8 (final pH = 1.1) |  |
|  | Demineralization temperature | = 35° C. |
|  | Electrodialysis time | = 19.5 h |
| Result: | Useful product yield | >99% |
|  | $SO_4^{2\ominus}$ depletion |  |

EXAMPLE 10

|  |  |  |
|---|---|---|
| Useful product: | C.I. Acid Blue 9 |  |
| Salt to be removed: | $Na_3PO_4$ |  |
| Diluate used: | Amount | = 1.5 kg |
|  | Useful product concentration | = 16.7% |
|  | $PO_4^{3\ominus}$ concentration | = 1.8% |
| Operation: | Acidified once with 80 g of 85% strength by weight $H_3PO_4$ to pH 2.9 (final pH = 2.0) |  |
|  | Demineralization temperature | = 35° C. |
|  | Electrodialysis time | = 24 h |
| Result: | Useful product yield | ≧99% |
|  | $PO_4^{3\ominus}$ depletion | = 91%. |

EXAMPLE 11 (COMPARATIVE EXAMPLE TO EXAMPLE 10)

|  |  |  |
|---|---|---|
| Useful product: | C.I. Acid Blue 9 |  |
| Salt to be removed: | $Na_3PO_4$ |  |
| Diluate used: | Amount | = 1.6 kg |
|  | Useful product concentration | = 16.7% |
|  | $PO_4^{3\ominus}$ concentration | = 1.8% |
| Operation: | No acid added (initial pH = 11.5; final pH = 11.3) |  |
|  | Demineralization temperature | = 35° C. |
|  | Electrodialysis time | = 24 h |
| Result: | Useful product yield | ≧99% |
|  | $PO_4^{3\ominus}$ depletion | = 23%. |

EXAMPLE 12

|  |  |  |
|---|---|---|
| Useful product: | C.I. Acid Blue 9 |  |
| Salt to be removed: | $Na_2C_2O_4$ (sodium oxalate) |  |
| Diluate used: | Amount | = 1.5 kg |
|  | Useful product concentration | = 17.4% |
|  | $C_2O_4^{2\ominus}$ concentration | = 1.3% |
| Operation: | Acidified once with 17 g of 36% strength by weight HCl to pH 2.8 (final pH = 2.2) |  |
|  | Demineralization temperature | = 34° C. |

-continued

|  |  |  |
|---|---|---|
|  | Electrodialysis time | = 10 h |
| Result: | Useful product yield | ≧99% |
|  | $C_2O_4^{2\ominus}$ depletion | = 99% |
|  | $Cl^{\ominus}$ content in discharge diluate | <0.004%. |

EXAMPLE 13 (COMPARATIVE EXAMPLE TO EXAMPLE 12)

|  |  |  |
|---|---|---|
| Useful product: | C.I. Acid Blue 9 |  |
| Salt to be removed: | $Na_2C_2O_4$ (sodium oxalate) |  |
| Diluate used: | Amount | = 1.5 kg |
|  | Useful product concentration | = 17.4% |
|  | $C_2O_4^{2\ominus}$ concentration | = 1.3% |
| Operation: | No acid added (initial pH = 6.3; final pH = 6.0) |  |
|  | Demineralization temperature | = 34° C. |
|  | Electrodialysis time |  |
| Result: | Usefult product yield | ≧99% |
|  | $C_2O_4^{2\ominus}$ depletion | = 67%. |

EXAMPLE 14

|  |  |  |
|---|---|---|
| Useful product: | C.I. Acid Blue 74 |  |
| Salt to be removed: | $Na_2SO_4$ |  |
| Diluate used: | Amount | = 1.5 kg |
|  | Useful product concentration | = 5.4% |
|  | $SO_4^{2\ominus}$ concentration | = 2.3% |
| Operation: | Continuously acidified with 28 g of 96% strength by weight $H_2SO_4$ to pH 1.0 |  |
|  | Demineralization temperature | = 34° C. |
|  | Electrodialysis time | = 28 h |
| Result: | Useful product yield | ≧99% |
|  | $SO_4^{2\ominus}$ depletion | =71%. |

EXAMPLE 15 (COMPARATIVE EXAMPLE TO EXAMPLE 14)

|  |  |  |
|---|---|---|
| Useful product: | C.I. Acid Blue 74 |  |
| Salt to be removed: | $Na_2SO_4$ |  |
| Diluate used: | Amount | = 1.6 kg |
|  | Useful product concentration | = 5.4% |
|  | $SO_4^{2\ominus}$ concentration | = 2.3% |
| Operation: | No acid added (initial pH = 3.6; final pH = 3.3) |  |
|  | Demineralization temperature | = 34° C. |
|  | Electrodialysis time | = 28 h |
| Result: | Useful product yield | ≧99% |
|  | $SO_4^{2\ominus}$ depletion | = 18%. |

EXAMPLE 16

|  |  |  |
|---|---|---|
| Useful product: | C.I. Acid Red 18 |  |
| Salt to be removed: | $Na_2SO_4$ and NaCl |  |
| Diluate used: | Amount | = 1.5 kg |
|  | Useful product concentration | = 7.3% |
|  | $SO_4^{2\ominus}$ concentration | = 2.2% |
|  | $Cl^{\ominus}$ concentration | = 0.6% |
| Operation: | Continuously acidified with 50 g of 96% strength by weight $H_2SO_4$ to pH 1.0 |  |
|  | Demineralization temperature | = 38° C. |
|  | Electrodialysis time | = 18 h |
| Result: | Useful product yield | ≧99% |
|  | $SO_4^{2\ominus}$ depletion | = 85% |
|  | $Cl^{\ominus}$ depletion | >99%. |

EXAMPLE 17 (COMPARATIVE EXAMPLE TO EXAMPLE 16)

|  |  |  |
|---|---|---|
| Useful product: | C.I. Acid Red 18 |  |
| Salt to be removed: | $Na_2SO_4$ and NaCl |  |
| Diluate used: | Amount | = 1.5 kg |
|  | Useful product concentration | = 7.3% |
|  | $SO_4^{2\ominus}$ concentration | = 2.2% |
|  | $Cl^{\ominus}$ concentration | = 0.6% |
| Operation: | No acid added (initial pH = 6; final pH = 5) |  |
|  | Demineralization temperature | = 38° C. |

-continued

|  |  |  |
|---|---|---|
| Result: | Electrodialysis time | = 18 h |
|  | Useful product yield | ≧99% |
|  | $SO_4^{2\ominus}$ depletion | = 7% |
|  | $Cl^\ominus$ depletion | = 99%. |

EXAMPLE 18

| | | |
|---|---|---|
| Useful product: | C.I. Acid Red 18 | |
| Salt to be removed: | $Na_2C_2O_4$ (sodium oxalate) and $Na_2SO_4$ | |
| Diluate used: | Amount | = 1.1 kg |
| | Useful product concentration | = 8.9% |
| | $C_2O_4^{2\ominus}$ concentration | = 1.8% |
| | $SO_4^{2\ominus}$ concentration | = 0.8% |
| Operation: | Continuously acidified with 31 g of 36% strength by weight HCl to pH 2.0 | |
| | Demineralization temperature | = 35° C. |
| | Electrodialysis time | = 9 h |
| Result: | Useful product yield | >99% |
| | $C_2O_4^{2\ominus}$ concentration | = 96% |
| | $SO_4^{2\ominus}$ depletion | |
| | $Cl^\ominus$ content in discharge diluate | = 0.01%. |

EXAMPLE 19 (COMPARATIVE EXAMPLE TO EXAMPLE 18)

| | | |
|---|---|---|
| Useful product: | C.I. Acid Red 18 | |
| Salt to be removed: | $Na_2C_2O_4$ (sodium oxalate) and $Na_2SO_4$ | |
| Diluate used: | Amount | = 1.0 kg |
| | Useful product concentration | = 8.9% |
| | $C_2O_4^{2\ominus}$ concentration | = 1.8% |
| | $SO_4^{2\ominus}$ concentration | = 0.8% |
| Operation: | No acid added (initial pH = 9; final pH = 7) | |
| | Demineralization temperature | = 35° C. |
| | Electrodialysis time | = 9 h |
| Result: | Useful product yield | >99% |
| | $C_2O_4^{2\ominus}$ depletion | |
| | $SO_4^{2\ominus}$ depletion | |

EXAMPLE 20

| | | |
|---|---|---|
| Useful product: | C.I. Acid Yellow 23 | |
| Salt to be removed: | $Na_2SO_4$ and NaCl | |
| Diluate used: | Amount | = 1.5 kg |
| | Useful product concentration | = 4.5% |
| | $SO_4^{2\ominus}$ concentration | = 2.4% |
| | $Cl^\ominus$ concentration | = 0.7% |
| Operation: | Continuously acidified with 46 g of 96% strength by weight $H_2SO_4$ to pH 1.0 | |
| | Demineralization temperature | = 35° C. |
| | Electrodialysis time | = 17 h |
| Result: | Useful product yield | ≧98% |
| | $SO_4^{2\ominus}$ depletion | = 78% |
| | $Cl^\ominus$ depletion | = 99%. |

EXAMPLE 21 (COMPARATIVE EXAMPLE TO EXAMPLE 20)

| | | |
|---|---|---|
| Useful product: | C.I. Acid Yellow 23 | |
| Salt to be removed: | $Na_2SO_4$ and NaCl | |
| Diluate used: | Amount | = 1.5 kg |
| | Useful product concentration | = 4.5% |
| | $SO_4^{2\ominus}$ concentration | = 2.4% |
| | $Cl^\ominus$ concentration | = 0.7% |
| Operation: | No acid added (initial pH = 8.6; final pH = 7.4) | |
| | Demineralization temperature | = 35° C. |
| | Electrodialysis time | = 17 h |
| Result: | Useful product yield | ≧98% |
| | $SO_4^{2\ominus}$ depletion | = 18% |
| | $Cl^\ominus$ depletion | = 98%. |

EXAMPLE 22

| | | |
|---|---|---|
| Useful product: | $C_9/C_{11}$-n-alkysulfonate | |
| Salt to be removed: | $Na_2SO_4$ | |
| Diluate used: | Amount | = 1.0 kg |
| | Useful product concentration | = 26.8% |
| | $SO_4^{2\ominus}$ concentration | = 4.1% |
| Operation: | Continuously acidified with 26 g of 96% strength by weight $H_2SO_4$ to pH 1.0 | |
| | Demineralization temperature | = 35° C. |
| | Electrodialysis time | = 7 h |
| Result: | Useful product yield | = 96% |
| | $SO_4^{2\ominus}$ depletion | = 74%. |

EXAMPLE 23 (COMPARATIVE EXAMPLE TO EXAMPLE 22)

| | | |
|---|---|---|
| Useful product: | $C_9/C_{11}$-n-alkysulfonate | |
| Salt to be removed: | $Na_2SO_4$ | |
| Diluate used: | Amount | = 1.0 kg |
| | Useful product concentration | = 26.8% |
| | $SO_4^{2\ominus}$ concentration | = 4.1% |
| Operation: | No acid added (initial pH = 2.6; final pH = 2.9) | |
| | Demineralization temperature | = 35° C. |
| | Electrodialysis time | = 7 h |
| Result: | Useful product yield | = 93% |
| | $SO_4^{2\ominus}$ depletion | = 10%. |

EXAMPLE 24

| | | |
|---|---|---|
| Useful product: | C.I. Reactive Blue 233 | |
| Salt to be removed: | $Na_2SO_4$ and NaCl | |
| Diluate used: | Amount | = 1.0 kg |
| | Useful product concentration | = 11.2% |
| | $SO_4^{2\ominus}$ concentration | = 1.1% |
| | $Cl^\ominus$ concentration | = 1.8% |
| Operation: | Continuously acidified with 82 g of 36% strength by weight HCl to pH 1.0 | |
| | Demineralization temperature | = 35°0 C. |
| | Electrodialysis time | = 4.5 h |
| Result: | Useful product yield | >99% |
| | $SO_4^{2\ominus}$ depletion | = 79% |
| | $Cl^\ominus$ depletion | = 96%. |

EXAMPLE 25 (COMPARATIVE EXAMPLE TO EXAMPLE 24)

| | | |
|---|---|---|
| Useful product: | C.I. Reactive Blue 233 | |
| Salt to be removed: | $Na_2SO_4$ and NaCl | |
| Diluate used: | Amount | = 1.0 kg |
| | Useful product concentration | = 11.2% |
| | $SO_4^{2\ominus}$ concentration | = 1.1% |
| | $Cl^\ominus$ concentration | = 1.8% |
| Operation: | No acid added (initial pH = 6.3; final pH = 6.20 | |
| | Demineralization temperature | = 35° C. |
| | Electordialysis time | = 4.5 h |
| Result: | Useful product yield | >99% |
| | $SO_4^{2\ominus}$ depletion | = 0% |
| | $Cl^\ominus$ depletion | = 95%. |

EXAMPLE 26

| | | |
|---|---|---|
| Useful product: | C.I. Reactive yellow 145 | |
| Salt to be removed: | $Na_2SO_4$ and NaCl | |
| Diluate used: | Amount | = 1.0 kg |
| | Useful product concentration | = 6.7% |
| | $SO_4^{2\ominus}$ concentration | = 2.4% |
| | $Cl^\ominus$ concentration | = 1.6% |
| Operation: | Continuously acidified with 78 g of 36% strength by weight HCl to pH 1.0 | |
| | Demineralization temperature | = 35° C. |
| | Electrodialysis time | = 6 h |
| Result: | Useful product yield | >99% |
| | $SO_4^{2\ominus}$ depletion | = 86% |
| | $Cl^\ominus$ depletion | = 96%. |

EXAMPLE 27 (COMPARATIVE EXAMPLE TO EXAMPLE 26

| | | |
|---|---|---|
| Useful product: | C.I. Reactive Yellow 145 | |
| Salt to be removed: | $Na_2SO_4$ and NaCl | |
| Diluate used: | Amount | = 1.0 kg |

-continued

|  | Useful product concentration | = 6.7% |
|---|---|---|
|  | $SO_4^{2\ominus}$ concentration | = 2.4% |
|  | $Cl^{\ominus}$ concentration | = 1.6% |
| Operation: | No acid added (initial pH = 6.0; final pH = 6.5) |  |
|  | Demineralization temperature | = 35° C. |
|  | Electrodialysis time | = 6 h |
| Result: | Useful product yield | >99% |
|  | $SO_4^{2\ominus}$ depletion | = 13% |
|  | $Cl^{\ominus}$ depletion | >99%. |

EXAMPLE 28

| Useful product: | C.I. Reactive Black 5 |  |
|---|---|---|
| Salt to be removed: | $Na_2SO_4$ |  |
| Diluate used: | Amount | = 1.0 kg |
|  | Usefule product concentration | = 6.3% |
|  | $SO_4^{2\ominus}$ concentration | = 2.2% |
| Operation: | Continuously acidified with 66 g of 36% strength by weight HCl to pH 1.0 |  |
|  | Demineralization temperature | = 35° C. |
|  | Electrodialysis time | = 3.5 h |
| Result: | Useful product yield | >99% |
|  | $SO_4^{2\ominus}$ depletion | = 55% |
|  | $Cl^{\ominus}$ content in discharge diluate | <0.01%. |

EXAMPLE 29 (COMPARATIVE EXAMPLE TO EXAMPLE 28)

| Useful product: | C.I. Reactive Black 5 |  |
|---|---|---|
| Satl to be removed: | $Na_2SO_4$ |  |
| Diluate used: | Amount | = 1.0 kg |
|  | Useful product concentration | = 6.3% |
|  | $SO_4^{2\ominus}$ concentration | = 2.2% |
| Operation: | No acid added (initial pH = 4.2; final pH = 4.4) |  |
|  | Demineralization temperature | = 35° C. |
|  | Electrodialysis time | = 3.5 h |
| Result: | Usefule product yield | >99% |
|  | $SO_4^{2\ominus}$ depletion | = 2%. |

I claim:

1. A process for removing a salt of a polybasic low molecular weight acid from an aqueous solution containing an anionic organic compound, comprising the steps of:
   (i) removing said salt from said solution by electrodialysis, and
   (ii) acidifying and maintaining said solution to a pH which is less than the value X+1, wherein X is the $pK_a$ of the second dissociation stage of said polybasic low molecular weight acid by adding an acidifying acid thereto, during said removing step (i), wherein the $pK_a$ of said acidifying acid is less than the $pK_a$ of the second dissociation stage of said polybasic low molecular weight acid, and
   (iii) wherein said salt of a polybasic low molecular weight acid is a salt of an acid selected from the group consisting of sulfurous, phosphorous, phosphoric, boric, carbonic, oxalic, maleic, fumaric, citric and adipic acids.

2. The process of claim 1, wherein said solution is acidified to a pH of from X−2 to X.

3. The process of claim 1, wherein said acidifying is continuous.

4. The process of claim 1, wherein said acidifying is batchwise.

5. The process of claim 1, wherein said acidifying is a continuous/batchwise hybrid process.

6. The process of claim 1, wherein at least 50% of said salt is removed.

7. The process of claim 1, wherein at least 75% of said salt is removed.

8. The process of claim 1, wherein at least 85% of said salt is removed.

9. The process of claim 1, wherein at least 99% of said salt is removed.

10. The process of claim 1, wherein said salt has a molecular weight less than or equal to 150.

11. The process of claim 1, wherein said salt of a polybasic low molecular weight acid is an alkaline metal, alkaline earth metal, ammonium, monoalkyl ammonium, dialkyl ammonium, trialkyl ammonium, tetraalkyl ammonium or benzyl trialkyl ammonium salt.

12. The process of claim 1, wherein said anionic organic compound is selected from the group consisting of fluorescent whitening agents, dyes, monocarboxylic acids, polycarboxylic acids, monosulfonic acids, polysulfonic acids, monophosphoric acids, and polyphosphoric acids.

13. The process of claim 12, wherein said anionic organic compound is a dye selected from the group consisting of monoazo dyes, bisazo dyes, trisazo dyes, anthraquinone dyes, dioxazine dyes, phthalocyanine dyes, quinophthalone dyes, triphenylmethane dyes and copper, chromium, cobalt, nickel and iron complexes thereof.

14. A process for removing a salt of a polybasic low molecular weight acid from an aqueous solution containing an anionic organic compound, comprising the steps of:
   (i) removing said salt from said solution by electrodialysis, and
   (ii) acidifying and maintaining said solution to a pH which is less than the value X+1, wherein X is the $pK_a$ of the second dissociation stage of said polybasic low molecular weight acid by adding an acidifying acid thereto, before said removing step (i), wherein the $pK_a$ of said acidifying acid is less than the $pK_a$ of the second dissociation stage of said polybasic low molecular weight acid, and
   (iii) wherein said salt of a polybasic low molecular weight acid is a salt of an acid selected from the group consisting of sulfurous, phosphorous, phosphoric, boric, carbonic, oxalic, maleic, fumaric, citric and adipic acids.

15. The process of claim 14, wherein said solution is acidified to a pH of from X−2 to X.

16. The process of claim 14, wherein said acidifying is continuous.

17. The process of claim 14, wherein said acidifying is batchwise.

18. The process of claim 14, wherein said acidifying is a continuous/batchwise hybrid process.

19. The process of claim 14, wherein said anionic organic compound is selected from the group consisting of fluorescent whitening agents, dyes, monocarboxylic acids, polycarboxylic acids, monosulfonic acids, polysulfonic acids, monophosphoric acids and polyphosphoric acids.

20. The process of claim 19, wherein said anionic organic compound is a dye selected from the group consisting of monoazo dyes, bisazo dyes, trisazo dyes, anthraquinone dyes, dioxazine dyes, phthalocyanine dyes, quinophthalone dyes, triphenylmethane dyes and copper, chromium, cobalt, nickel and iron complexes thereof.

* * * * *